AIR BEARING MAGNETIC HEAD MOUNTING

Filed Oct. 4, 1965

INVENTOR
WESLEY R. JOHNSON

BY Joseph A. Spelchick
AGENT

United States Patent Office 3,405,404
Patented Oct. 8, 1968

3,405,404
AIR BEARING MAGNETIC HEAD MOUNTING

Wesley R. Johnson, Minneapolis, Minn., assignor to Sperry Rand Corporation, New York, N.Y., a corporation of Delaware Filed Oct. 4, 1965, Ser. No. 492,385
16 Claims. (Cl. 340—174.1)

ABSTRACT OF THE DISCLOSURE

The present invention is directed to magnetic head structures. A particular head provides a stable mounting for a multiple channel flying magnetic record-read head. Ball points provide a zero clearance mount under load to reduce head vibration and yet allow the free movement necessary for landing the head in a flying position. The ball studs seat in cone and V-shaped ball seats, which hold accurately and reduce the need for close tolerances on the studs. The head is spring-retained to the cradle.

The present invention relates to data storage devices useful in computers and the like, and more particularly to such data storage apparatus utilizing a storage medium such as a magnetizable surface of a drum, disc file, tape or the like by a magnetic transducer assembly which may be moved into an operable position in close proximity to the surface.

More specifically the present invention is directed to the structure for mounting and movably maintaining magnetic transducer heads. Prior art methods for mounting magnetic heads possess a lack of operational stability, and have the disadvantage of not permitting head structure to freely rotate when landing same toward the recording surface, thus introducing possible potential damage to the recording surface. Furthermore, prior art mounting techniques for magnetic heads are characterized by complicated structural interrelations of cradle mounting and head body which leads to the operational instability. Another disadvantage of the prior art is salient in the structural features for accommodating lift-off and lowering structure for unloading and loading the head from the recording surface. As is well known the head member is subjected to forces, which in the event of the lift-off structure not being properly adjusted, will cause twisting and other deflections of the head member with possible serious damage to the record member. The present invention is intended to overcome the inherent inadequacies of prior art method by apparatus which is simply constructed, easily adjustable, operationally stable and reliable in operation.

The particular design configuration of the preferred embodiment of the present invention provides a stable mounting for a multiple channel flying magnetic record-read head. Ball points provide a zero clearance mount under load to reduce head vibration and yet allow the free movement necessary for landing the head. The ball points include studs seated in cone and V-shaped ball seats, which hold accurately and reduce the need for close tolerances on the studs. The design compensates for wear to maintain zero clearance necessary to minimize head vibration. An additional feature of the invention permits separation of the head from the U-shaped cradle for servicing and allows reinstallment to the original position without adjustment. The particular design of the present invention further allows the placement of the pivot point lower on the head body to improve stability of the head assembly when used as a flying head.

In another embodiment the ball studs are replaced by round shafts, one of which contains a notch and cooperates with a knife-like edge in the U-shaped cradle, and prevents axial shifting of the head body itself. The other shaft mates with a V-groove in the cradle structure. As in the preferred embodiment, disconnectable spring means hold the head body in contact with the cradle. In either of the embodiments, the head body is permitted to rotate, but not shift axially thus maintaining transducer alignment wtih respect to the recording tracks on the record surface.

Accordingly an object of the present invention is to provide an improved, simply constructed, compact, stable, and reliable magnetic head assembly.

Another object of the present invention is to provide a separable head body and cradle member.

An additional object of the present invention is to provide an improved lifting and landing cradle means for facilitating operations.

A further object of the present invention is to provide a magnetic record-read assembly of improved operational stability.

A still further object of the present invention is to provide improved record-read apparatus one or more of which are used with one or more magnetic surfaces.

These and other more detailed and specific objects will be disclosed in the course of the following specification reference being had to the accompanying drawings in which.

Figure 1:
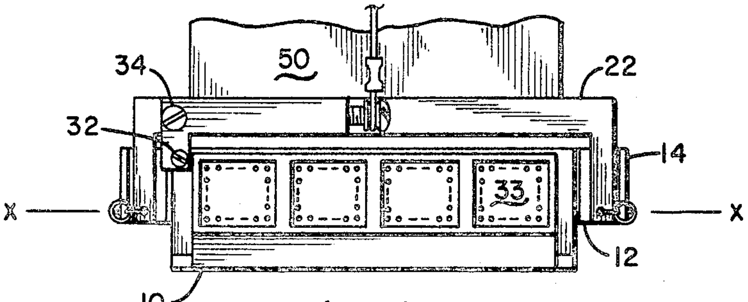
FIGURE 1 is a top view of the magnetic head assembly of a preferred embodiment of the present invention.
Figure 2:
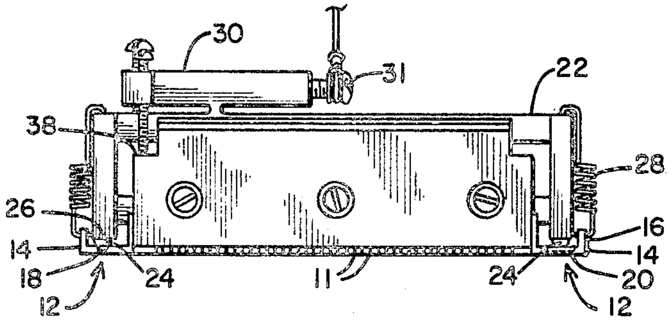
FIGURE 2 is a front view of the magnetic head assembly of FIGURE 1.
Figure 3:
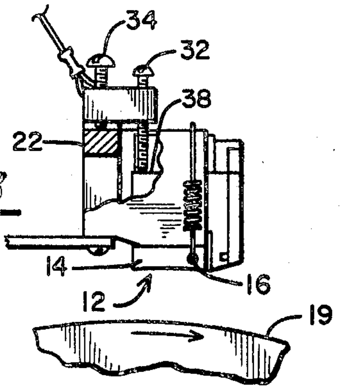
FIGURE 3 is an end view partially cut away of the magnetic head assembly of FIGURE 1 being lowered over a recording surface.

Referring now to FIGURES 1–3, there is shown a magnetic transducer body 10 containing therein, for example, 54 recording elements, there being, however, no limitation to 54 channels. Projecting from either side of the head body 10 is a channel-like extension 12 having an upturned edge 14. Through each of the edges 14 there projects a hole 16 the use of which will be more fully described below. In each of the extensions there is a recess, the one on the left being a cone shaped ball seat 18 and the one on the right being a V-shaped groove ball seat 20. The cone and V-shaped ball seats hold accurately and reduce the need for close tolerances of mating ball studs to be described. As shown in FIGURE 3, the bottom of the shelves are curved in conformance with the curvature of the recording surface 19.

With reference to FIGURES 1 and 2, there are shown views of the transducer head body and cradle mounting structure 22. The cradle 22 is substantially U-shaped and has fixedly mounted therein ball studs 24 on the bottom edge 26. Springs 28, one on each end of the U-shaped cradle, function to hold the head body 10 in the cradle, that is, the ball studs 24 are held in contact, respectively with the cone-shaped ball seat and the V-groove shaped seat in the extensions 12 when the assembly is being lifted from or lowered to the recording surface. The cradle may be disconnected from the head body by unhooking the springs for head maintenance purposes, for example. As a matter of fact, when the head is flying on the boundary layer of air over the rotating record surface, the springs have no necessary function. That is, the boundary layer forces the head body in such a direction as to cause the cone-shaped recess 18 and V-groove recess 20 in the head body shelf extensions 12 to mate with the ball studs 24 in the cradle. During lift-off and lowering, the springs maintain the ball studs and recesses in contact.

Formed integrally with the cradle or secured to the cradle in another suitable manner is a flexible projection 30 whose function will be described below. By way of reference to FIGURE 2, the flexible projection 30 may resemble a T-shaped configuration, although no limitation is intended thereby. As is well known in the flying head art, magnetic heads must be lowered into position over the record-read record surface with great care in order to cause the head to meet the surface at a predetermined angle of attack. Once lowered, the heads float on a cushion of air formed on the record surface. Some means must be provided to prevent the head from orienting itself outside of this predetermined angle of attack, and as well, some means must be provided to preclude excessive twisting of the head about its transverse axis, that is, the axis traverse to the direction of magnetic drum rotation. The present invention accommodates both hazards by use of the flexible projection 30. As illustrated, the lift cable is connected to one end of the projection by an adjustable screw 31 or other suitable means. Extending downwardly through the projections are two threaded holes which receive screws 32 and 34. Each of the screws is adjustable as desired. Screw 34 is aligned with the top surface 36 of the cradle while screw 32 is aligned with ledge 38 of the magnetic transducer body itself. While the cable is raised or lowered to allow the recording member 10 to depart from or ride on the boundary air flow layer over the rotating record surface, the T-shaped projection 30 flexes but is limited in its flexing by the particular adjustment of the screw 34. While the recording member is being lowered to the air stream, screw 32 restricts the rotational movement of the head around a longitudinal axis X—X by abutting the ledge whenever the head tends to rotate past the predetermined angle of attack. When flying, there exists a gap between the ledge 38 and the end of the stop screw 32. Similarly, a gap exists between the end of the stop screw 34 and the cradle while the head is flying. An additional function of stop screw 34 is inherently present in the resilient projection 30. As can be seen, stop screw 32 is given a predetermined adjustment to limit rotational motion of the head body during lifting and landing operations. In the absence of stop screw 34, the flexing movement of the resilient projection 30 would effectively change the gap setting of the stop screw 32 with respect to the head body ledge 38. In prior art head and cradle assemblies, an adjustable stop screw was mounted in a rigid portion of the head body. Accordingly, when the assembly was lowered into flying position, not only did the head body rotate, but so did the cradle. This was due to the fact that the cradle, in being secured to the loading or support member 50, must necessarily position itself when flying. Obviously, any prior setting of the rigidly mounted stop was rendered incorrect. As a result, the stop screw tended to dig into the head body whereas normally a gap must exist between the stop screw and the head body in the flying position. If the stop screw was set far enough so that a gap would exist in the flying position of the head, then upon lowering or lifting of the cradle, the gap was so great as to completely eliminate the need for the stop screw as a means for orienting the head at a predetermined angle of attack. However, the design of the present invention eliminates this situation by the use of an external flexible projection 30. When the cable has tension applied to it, the stop screw 34 mounting is flexed counterclockwise until the bottom of the screw contacts the cradle surface. It is evident, therefore, that the amount of flexing can be restricted by adjustment of stop screw 34. Accordingly, stop screw 32 can be accurately positioned so as to orient the head body at a predetermined angle of attack since it is part of the same resilient projection 30.

On the top surface of head body is an array of lead pins 33 which are electrically connected to the individual transducer elements 11 and to which are made the external electrical interconnections. The array grouping permits a dense packaging arrangement necessary where a great number of transducers are incorporated into the head body as in the present embodiments illustrated.

Figures 4, 5:
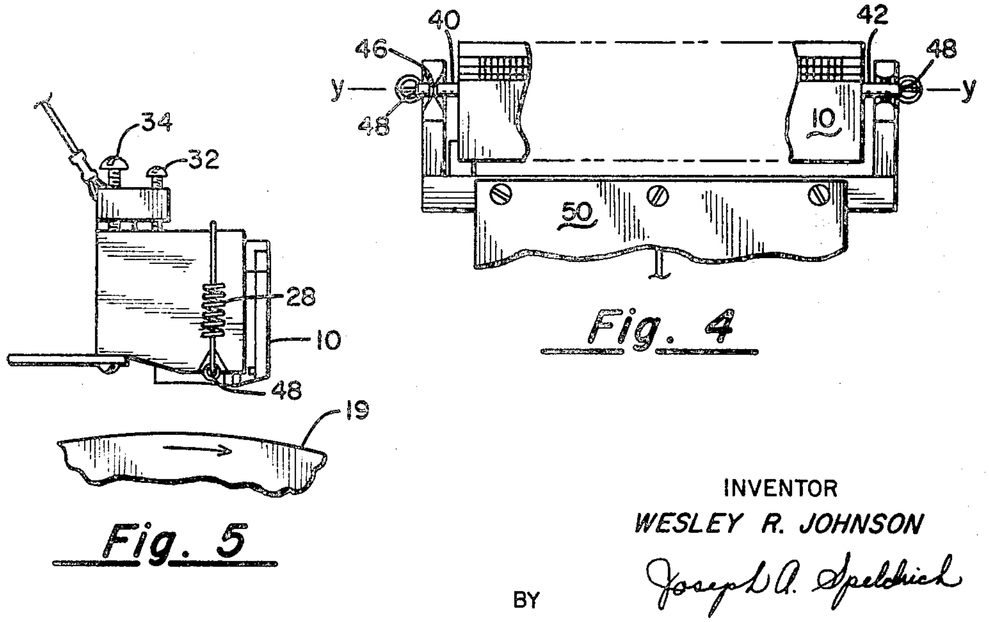
FIGURE 4 is a top view of a modified magnetic head assembly.
FIGURE 5 is an end view of the modified magnetic head assembly of FIGURE 4 showing a modified mounting means being lowered over a recording surface.

There is illustrated in FIGURES 4 and 5 a modification of the preferred embodiment wherein the extensions 12 are replaced by round shafts 40 and 42 also attached to the head body 10. The head body and cradle likewise accomplishes positive and precise alignment with the recording surface as does the preferred embodiment. One of the bottom ledges 44, corresponding to ledge 26 in the preferred embodiment has a knife-like edge which seats in a notch 46 in round shaft 40. Round shaft 42 merely seats in a V-groove in the other cradle arm portion. Therefore, it is evident that the head body is precluded from shifting between the cradle arms because of the knife edge of the cradle seating in the slotted shaft 40. However, the head body is not precluded from rotation around a longitudinal axis, *y—y*, through the shafts 40 and 42. Accordingly, the immediate modification permits the same degree of head movement freedom as in the preferred embodiment. With the exception of the round shafts and slight cradle modification to accommodate the shafts, no other design changes are required. As in the preferred embodiment, the springs may be unhooked to permit replacement or maintenance of the head body 10 by removing one end from a hole 48 in the end of the shafts 40 and 42. Flexible members 50 represent the magnetic head assembly support means which are in turn attached at their other end to support members extending parallel to magnetic drum recording surface where the present invention is applied to drum storage systems. The support means may be secured in a suitable manner to the housing end plate members. A plurality of support members may be disposed around the drum periphery with each member supporting a magnetic head assembly by the flexible member 50. The support members may be movably mounted by spring and cam means between the end plates or other suitable arrangements to allow axial adjustment of the support members for aligning the individual transducers with respect to the storage tracks on the recording surface.

It is to be understood that suitable modifications may be made in the apparatus and method as disclosed provided that such modifications come within the spirit and scope of the appended claims. Having now, therefore, fully illustrated and described my invention, what I claim to be new and desire to protect by letters patent is set forth in the appended claims.

What is claimed is:

1. A magnetic head assembly for use in recording on a magnetizable record surface comprising:

(A) an elongated longitudinally extending transducer head body mounting a plurality of magnetic transducer elements;

(B) first and second extensions on each end of said head body, said first extension containing a conical recess portion and the second extension containing a V-shaped recess portion;

(C) a substantially U-shaped cradle arm means mounting ball studs at ends of the U;

(D) biasing means cooperating with the cradle and the extensions to maintain said ball studs in their respective recesses when the head is raised and lowered from the record surface;

(E) and head assembly support means for supporting the head body and cradle means.

2. The invention of claim 1 wherein said cradle includes a resilient projection means.

3. The invention of claim 1 wherein said cradle includes a resilient projection means mounting a plurality of adjustable means.

4. The invention of claim 1 wherein said cradle includes a resilient projection means mounting a plurality of adjustable members, one of said adjustable members being aligned with said head body to limit rotational movement of said head body, a second one of said adjustable members being aligned with the cradle means to limit movement of the resilient projection, and a third one of said adjustable means being operatively associated with raising and lowering means for the assembly.

5. A magnetic head assembly for use in recording on a magnetizable record surface comprising:

(A) a multichannel transducer head body;

(B) support means coupled to and extending from either end of the body each of said support means including a recess therein;

(C) a substantially U-shaped cradle means for cooperating with said head body and having first and second rotatable bearing portions for cooperating with respective ones of said recesses in said support means; and (D) first and second spring biasing means interconnecting said cradle means and said support means adjacent said first and second rotatable bearing portions for maintaining said cradle portion and support means in a supporting relationship when the assembly is raised and lowered with respect to a record surface.

6. The invention of claim 5 wherein said cradle means includes a resilient projection having at least one adjustable rotation control means mounted therein for cooperating with said head body during raising and lowering thereof.

7. The invention of claim 5 wherein said cradle includes a T-shaped resilient projection cooperating with a raising and lowering means and mounting a plurality of adjustable means.

8. The invention of claim 7 wherein said adjustable means include:

(A) a first adjustable stop member cooperating with the head body for limiting rotational movement of said head body when the assembly is raised and lowered with respect to the record surface;

(B) a second adjustable stop member cooperating with the cradle means to limit twisting movement of the resilient projection when said lifting and lowering means is operative during raising and lowering of the magnetic head assembly with respect to the record surface.

9. The invention of claim 7 wherein said support means are shafts and cooperate with recesses in said portion of the U-shaped cradle means to limit movement of the head body in a lineal direction and to permit rotational movement of the head body around an axis extending through the point of contact between the support means and the cradle means.

10. The invention of claim 9 wherein one of said shafts contains a notch and wherein a cooperating recess in the cradle is knife-edged.

11. The invention of claim 5 wherein said support means are channel-like in configuration and contain recesses cooperating with projections on said cradle portion to prevent lineal movement of the head body and to permit rotational movement of the head body along an axis extending through the point of contact between the support means and the cradle means.

12. The invention of claim 11 wherein said recesses in the support means are a cone-shaped recess and a V-groove recess and wherein said cradle projections are ball studs cooperating therein.

13. A magnetic transducer assembly for recording on a magnetizable surface comprising:

(A) an elongated longitudinally extending transducer head body mounting a plurality of transducer elements;

(B) shelf-like support means extending from each longitudinal end of said head body and having an upturned edge, one of the support means containing at the bottom of the shelf a conical recess portion and another one of the support means containing at the bottom of its shelf a V-groove recess portion;

(C) a U-shaped cradle arm member adapted to receive the head body within the U, said cradle member fixedly mounting ball studs at a bottom surface thereof;

(D) disconnectable spring means connected to said U-shaped cradle member and to said upturned edge for maintaining said ball studs in contact with the respective recesses when the assembly is raised and lowered with respect to the record surface;

(E) and a resilient projection connected to said cradle member mounting a first adjustable stop member cooperating with said head body to limit rotational movement of the head body around the longitudinal axis, a second adjustable stop member for limiting twisting of the resilient projection when the assembly is raised or lowered with respect to the recording surface, and a third adjustable member cooperating with a raising and lowering means.

14. A magnetic transducer assembly for recording on a magnetizable surface comprising:

(A) an elongated longitudinally extending transducer head body mounting a plurality of transducer elements;

(B) shaft support means extending from each end of the head body and having a hole in the end thereof, one of the shafts having a slot extending around the periphery thereof;

(C) a U-shaped cradle arm member adapted to receive the head body within the U, said cradle member containing a knife edge at one portion thereof and a V-groove at another portion thereof;

(E) disconnectable spring means connected to said U-shaped cradle member and to said shaft holes for maintaining the knife edge in the slot and the V-groove in contact with the other shaft when the assembly is raised and lowered with respect to the record surface;

(F) and a resilient projection connected to said cradle member mounting a first adjustable stop member cooperating with said head body to limit rotational movement of the head body around the longitudinal axis, a second adjustable stop member for limiting twisting of the resilient projection when the assembly is raised or lowered with respect to the recording surface, and a third adjustable member cooperating with a raising and lowering means.

15. A magnetic head assembly for use with a magnetizable record surface comprising:

(A) a longitudinally extending multichannel magnetic head member;

(B) a support arm extending out from either end of the head member along a longitudinal dimension, each of said support arms including a flat shelf-like portion, one of the shelf portions containing a conically shaped recess and the other shelf portion containing a V-groove recess;

(C) a U-shaped cradle arm member for receiving the head member within the U, the arm portions of the U extending transversely to the longitudinal dimension of said head member and disposed over the support arms, the bottom of each arm portion facing the support arms having fixedly mounted therein a projecting stud member;

(D) disconnectable biasing means each connected at one end thereof to a top surface of said cradle arm and at the other end to a support arm for retaining the projecting stud members in contact with their associated recesses when the assembly is raised and lowered with respect to the record surface;

(E) a resilient projection attached near one longitudinal end of the cradle member, the projection having an extending leg projecting over one end of the head member, the resilient projection also mounting a plurality of adjustable members including a first adjustable stop screw member aligned with the cradle member and a second adjustable stop screw member aligned with the head member.

16. The invention of claim 15 including a third adjustable member cooperating with an assembly raising and lowering means and wherein the first stop screw member is adjustable to limit movement of the resilient projection and wherein the second stop screw member is adjustable to limit rotational movement of the head member along a longitudinal axis extending along a point of contact between the projecting studs and recesses and wherein an adjustment setting of the first stop screw member determines an adjustment setting of the second stop screw member to cause the head member to be oriented at a particular angle when being raised or lowered with respect to the record surface and whereby the first and second stop screw members are in non-contact relationship with the cradle and head members when the head member is reading or recording with respect to the record surface.

References Cited

UNITED STATES PATENTS

| | | | |
|---|---|---|---|
| 3,249,701 | 5/1966 | Silver | 340—174.1 |
| 3,071,773 | 1/1963 | Haughton et al. | 340—174.1 |
| 3,060,277 | 10/1962 | Baker et al. | 340—174.1 |
| 3,041,612 | 6/1962 | Woodcock | 340—174.1 |
| 2,862,781 | 12/1958 | Baumeister | 340—174.1 |

BERNARD KONICK, *Primary Examiner.*

A. I. NEUSTADT, *Assistant Examiner.*